(12) United States Patent
Koulomzin

(10) Patent No.: US 9,015,313 B2
(45) Date of Patent: Apr. 21, 2015

(54) PROVIDING ACTIONABLE CONTENT TO A COMPUTING DEVICE BASED ON USER ACTIONS

(71) Applicant: Google Inc., Mountain View, CA (US)

(72) Inventor: Daniel George Koulomzin, Jamaica Plain, MA (US)

(73) Assignee: Google Inc., Mountain View, CA (US)

( * ) Notice: Subject to any disclaimer, the term of this patent is extended or adjusted under 35 U.S.C. 154(b) by 273 days.

(21) Appl. No.: 13/830,348

(22) Filed: Mar. 14, 2013

(65) Prior Publication Data

US 2014/0280877 A1    Sep. 18, 2014

(51) Int. Cl.
*H04L 12/26*    (2006.01)

(52) U.S. Cl.
CPC ............... *H04L 43/16* (2013.01); *H04L 12/26* (2013.01)

(58) Field of Classification Search
USPC ........................... 709/224–226; 707/707–712
See application file for complete search history.

(56) References Cited

U.S. PATENT DOCUMENTS

| | | |
|---|---|---|
| 2002/0065041 A1 | 5/2002 | Lunsford et al. |
| 2009/0282021 A1 * | 11/2009 | Bennett .............................. 707/5 |
| 2011/0230174 A1 | 9/2011 | Mandanapu et al. |
| 2012/0023226 A1 | 1/2012 | Petersen et al. |
| 2012/0042257 A1 | 2/2012 | Aftab et al. |
| 2012/0084292 A1 | 4/2012 | Liang et al. |
| 2012/0117093 A1 | 5/2012 | Shilovitsky et al. |
| 2012/0136991 A1 | 5/2012 | Gindentuller et al. |
| 2012/0269116 A1 | 10/2012 | Xing et al. |
| 2012/0278432 A1 | 11/2012 | Luna |
| 2014/0095652 A1 * | 4/2014 | Bichot et al. .................. 709/217 |

OTHER PUBLICATIONS

Shaun K. Kane et al., "Exploring Cross-Device Web Use on PCs and Mobile Devices", 2004, http://research.microsoft.com/pubs/80167/cross_device_web_interact.pdf, The Information School, DUB Group, University of Washington Seattle, WA 98052 USA.

* cited by examiner

*Primary Examiner* — Ebrahim Golabbakhsh
(74) *Attorney, Agent, or Firm* — Middleton Reutlinger

(57) ABSTRACT

Methods and apparatus related to identifying content accessed on a computing device that is likely actionable on another computing device. Some implementations are directed to methods and apparatus for identifying a computing device of a user, identifying content accessed on another computing device by the user, determining content that is actionable on the computing device, determining a confidence level that the actionable content is of interest to the user, and providing the actionable content for use on the computing device if the confidence level satisfies a threshold. The confidence level may be based on an indication of time passage between the user accessing the content on the other computing device and the identified use of the computing device.

28 Claims, 6 Drawing Sheets

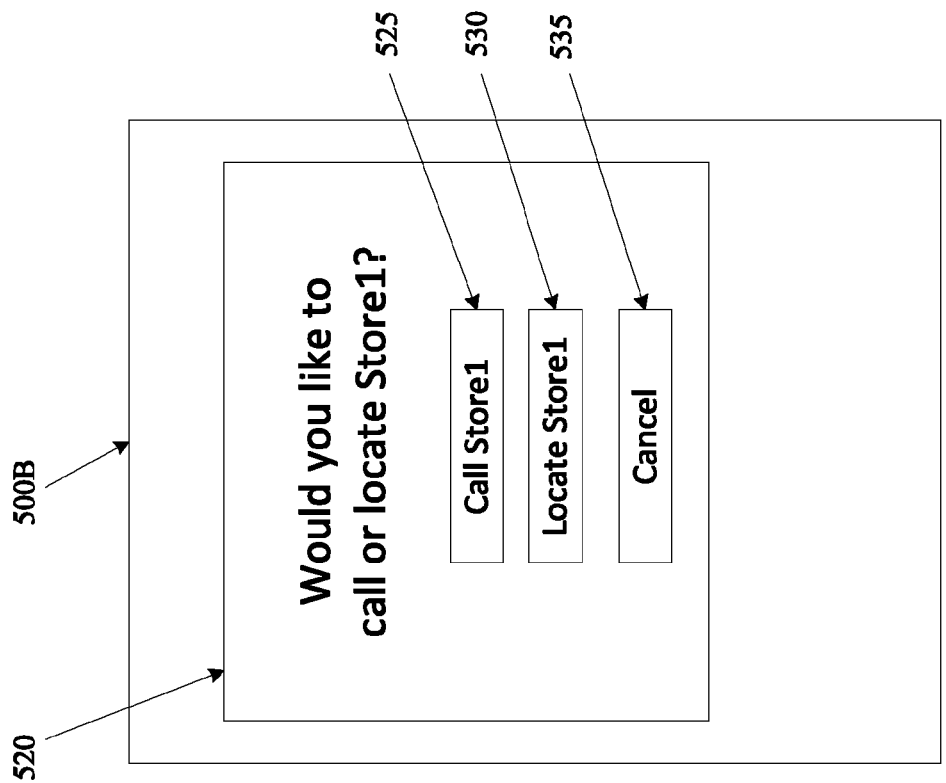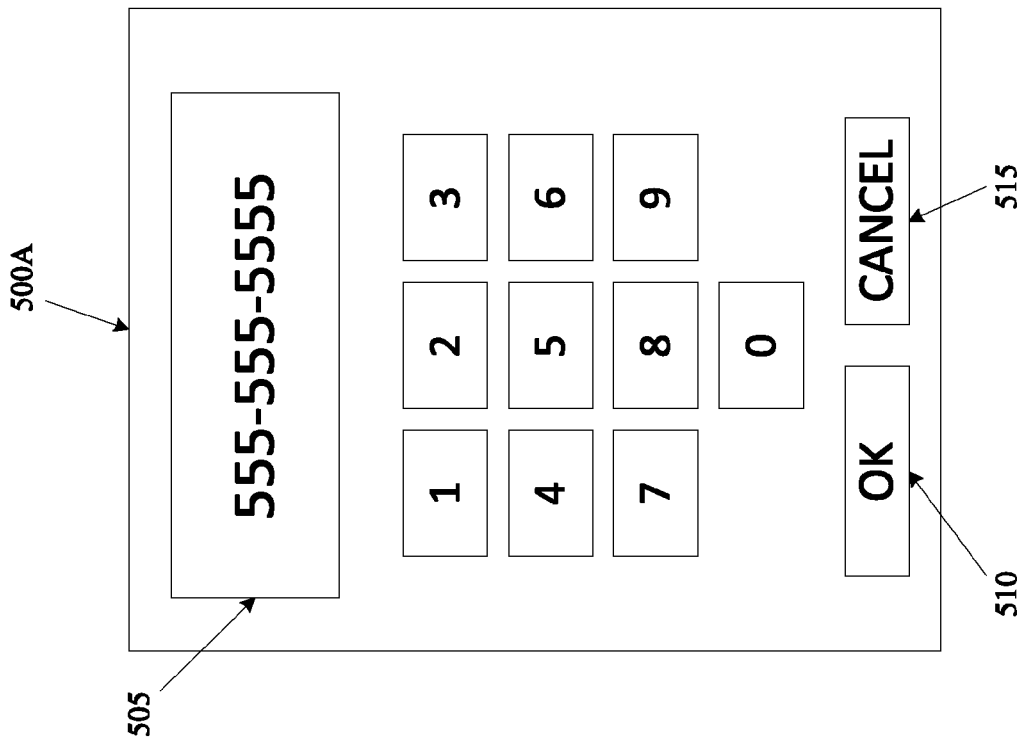

PROVIDING ACTIONABLE CONTENT TO A COMPUTING DEVICE BASED ON USER ACTIONS

BACKGROUND

This specification is directed generally to identifying content accessed by a user on a computing device that is actionable on another computing device and/or providing one or more aspects of the user accessed content for use by the other computing device.

A user sometimes may utilize a second computing device to act upon content accessed on a separate first computing device. For example, a user may access a phone number on a webpage of a desktop computing device and subsequently use a mobile phone computing device to call the phone number.

SUMMARY

The present disclosure is directed to methods and apparatus for identifying user accessed content that is actionable on a computing device and/or providing the actionable content for use by the computing device. In some implementations, whether the actionable content is provided for use by the computing device may be based on the likelihood that the actionable content will be used in one or more applications on the computing device. For example, some implementations are directed to methods and apparatus for identifying actionable content accessed by the user on a computing device, identifying the user accessing a separate second computing device, and providing the actionable content to the second computing device based on the time passage between accessing the actionable content on the computing device and the user accessing the second computing device. Actionable content may include, for example, phone numbers, addresses, events, tasks, and/or dates identified based on a webpage or other document that is accessed by a user on a computing device.

In some implementations a computer implemented method may be provided that includes the steps of: identifying a computing device of a user, the computing device configured to execute one or more applications; identifying content accessed on at least one other computing device by a user, the other computing device being separate from the computing device; determining actionable content based on the content accessed on the other computing device by the user, wherein the actionable content is useable by one or more applications on the computing device; identifying a use of the computing device by the user; determining a confidence level of interest in the actionable content, the confidence level based on an indication of time passage between the user accessing the content on the other computing device and the identified use of the computing device by the user; and providing the actionable content to the computing device if the confidence level of interest in the actionable content satisfies a threshold.

This method and other implementations of technology disclosed herein may each optionally include one or more of the following features.

The identified use may be indicative of executing a given application of the one or more applications. The method may further include determining at least one potential use for the actionable content. The method may further include comparing the identified use and the potential use, wherein the confidence level is based on the comparison. The actionable content may be provided to the user only when the at least one potential use includes the identified use. The method may further include the steps of: identifying at least one potential use for the actionable content; identifying a likely type of use of the computing device; and comparing the likely type of use to the potential use; wherein the confidence level is based on the comparison.

The method may further include determining whether the actionable content is actively displayed on the other computing device, wherein the confidence level is based on whether the actionable content is actively displayed on the computing device. The confidence level may satisfy the threshold when the actionable content is actively displayed on the computing device.

The method may further include determining at least one potential use for the actionable content based on one or more actions taken by the user to arrive at the identified content. The one or more actions may include utilizing a given search term in accessing the identified content. The one or more actions may include utilizing a given navigation link in accessing the identified content.

The method may further include determining the confidence level based on one or more actions taken by the user to arrive at the identified content. The one or more actions may include utilizing a given search term in accessing the identified content. The one or more actions may include utilizing a given navigation link in accessing the identified content.

The method may further include identifying a likely use type of the computing device and comparing the likely use type to the actionable content, wherein the confidence level is based on the comparison.

The method may further include identifying a likelihood of utilizing the actionable content on the other computing device, wherein the confidence level is based on the likelihood of utilizing the actionable content on the other computing device.

Other implementations may include a non-transitory computer readable storage medium storing instructions executable by a processor to perform a method such as one or more of the methods described herein. Yet another implementation may include a system including memory and one or more processors operable to execute instructions, stored in the memory, to perform a method such as one or more of the methods described herein.

Particular implementations of the subject matter described herein identify content accessed on a computing device by a user that is actionable on a separate second computing device, determine a confidence level that the user has interest in the actionable content on the second computing device, and provide the actionable content to the second computing device when the confidence level satisfies a threshold. The content may be utilized by one or more engines to identify the actionable content and to determine the confidence level that the user has interest in the actionable content. Particular implementations of the subject matter herein may determine the confidence level based on an indication of time passage between the user accessing the content on the computing device and an identified use of the second computing device. Particular implementations of the subject matter described herein may additionally and/or alternatively identify the application executed on the second computing device and may determine the confidence level based on a potential use of the actionable content and the identified application. Particular implementations of the subject matter described herein may additionally and/or alternatively identify a computing device property of the second computing device and may determine the confidence level based on the identified computing device property. Particular implementations of the subject matter described herein may additionally and/or alternatively provide the actionable content to the second computing device only when the second computing device is accessed while the actionable content is actively displayed on the computing device.

It should be appreciated that all combinations of the foregoing concepts and additional concepts discussed in greater detail herein are contemplated as being part of the inventive subject matter disclosed herein. For example, all combinations of claimed subject matter appearing at the end of this disclosure are contemplated as being part of the inventive subject matter disclosed herein.

BRIEF DESCRIPTION OF THE DRAWINGS

FIGS. 5A and 5B illustrate example graphical user interfaces for a computing device to display after receiving actionable content.

DETAILED DESCRIPTION

Figure 1:
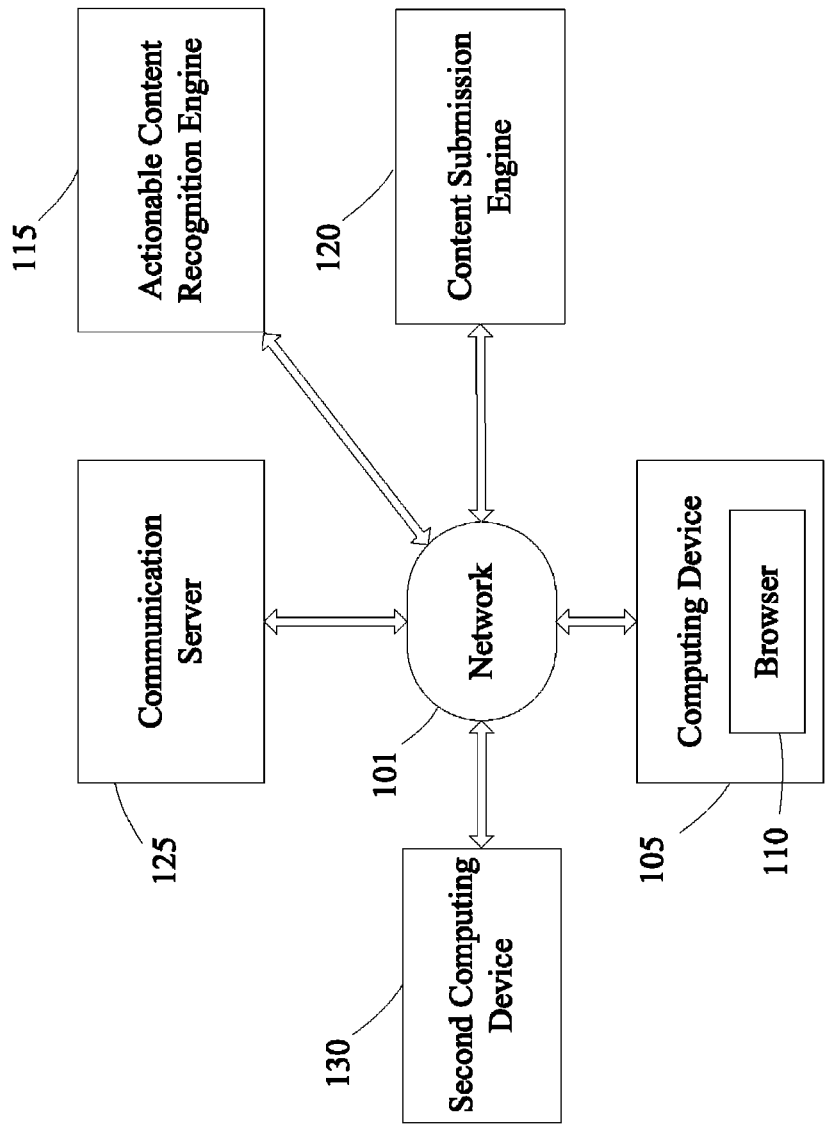
FIG. 1 is a block diagram of an example environment in which actionable content accessed via one or more computing devices may be identified and/or provided to one or more separate computing devices.

FIG. 1 illustrates a block diagram of an example environment in which actionable content on one or more computing devices may be identified and/or provided to one or more separate computing devices. The communication network 101 facilitates communication between the various components in the environment. In some implementations, the communication network 101 may include the Internet, one or more intranets, and/or one or more bus subsystems. The communication network 101 may optionally utilize one or more standard communications technologies, protocols, and/or inter-process communication techniques. The example environment also includes a computing device 105 with a browser 110; an actionable content recognition engine 115; a content submission engine 120; a communication server 125; and a second computing device 130. Computing device 105 may be utilized by a user to access one or more documents that may contain content that may be useful to a user on a second computing device, such as the second computing device 130. For the purposes of this specification, a document is any data that is associated with a document address. Documents include webpages, word processing documents, portable document format (PDF) documents, images, video, audio, e-mails, calendar entries, task entries, and feed sources, to name just a few. The documents may include content such as, for example: words, phrases, pictures, audio, task identifiers, entity identifiers, etc.; embedded information (such as meta information and/or hyperlinks); and/or embedded instructions (such as JavaScript scripts).

In some implementations, a browser 110 may be utilized by the user to access one or more documents that may contain content that is actionable on a second computing device 130. For example, the user may access a webpage that displays an address, a telephone number, a date, an email address, and/or a contact name. Also, for example, a user may access a user-edited document that contains one or more categories of actionable content within the document. Also, for example, a user may access a calendar entry of the user that identifies an upcoming meeting, a task to be completed, and/or an approaching appointment. Computing device 105 may share one or more characteristics with the computing device illustrated in FIG. 6 and described herein.

The user may have interest in utilizing part of information accessed on the computing device 105 at a later time on the second computing device 130. For example, in some implementations the second computing device 130 may be a mobile phone and a user may have interest in using the second computing device 130 to dial a phone number that was displayed on a webpage on the computing device 105. Also, for example, a user may utilize the second computing device 130 to access one or more applications, such as an email application, a calendar, a contacts list, and/or a web-based email server, which may be able to utilize content previously accessed and/or viewed by the user via the computing device 105. One or more aspects of content of a document may optionally be parsed to determine whether the document contains actionable content and/or what type of actionable content is available in the document. In some implementations, the entire content of a document may be transmitted to the second computing device 130 for potential use.

Generally speaking, in some implementations, the actionable content recognition engine 115 may identify potentially actionable content based on one or more webpages and/or other documents that have been accessed by a user utilizing the computing device 105. Actionable content recognition engine 115 may provide the content submission engine 120 with the potentially actionable content. Content submission engine 120 may determine a confidence level indicative of the likelihood that the user has interest in accessing the actionable content on the second computing device 130. If the confidence level that is determined by the content submission engine 120 satisfies a threshold confidence level, content submission engine 120 may provide communication server 125 with the actionable content. The communication server 125 may provide the second computing device 130 with the actionable content when the second computing device 130 requests to receive actionable content and/or is available to receive actionable content. In some implementations, the content submission engine 120 may submit the actionable content directly to the second computing device 130. In some implementations, the second computing device 130 may receive actionable content from the content submission engine 120 and/or the communication server 125 may provide actionable content to the second computing device 130 without receiving a request from second computing device 130. As discussed herein, in some implementations actionable content may additionally and/or alternatively be identified at second computing device 130 and provided to computing device 105.

In some implementations, the user may authorize and/or limit one or more aspects of the functionality of the system described herein. For example, permission may be requested from the user before providing the second computing device 130 with actionable content. In some implementations permission of the user may be requested before one or more documents are analyzed for actionable content by the actionable content recognition engine 115, before content submission engine 120 determines whether potentially actionable content is desired by the user, before content submission engine 120 transmits actionable content to a computing device and/or communication server 125, before the computing device polls and/or receives actionable content from content submission engine 120 and/or communication server 125, before the computing device provides details of user interactions with the computing device, and/or before the computing device establishes communication with content submission engine 120 and/or communication server 125. In some implementations, user authorization may be requested utilizing browser 110, an application executing on computing device 105, and/or an application executing on second computing device 130.

In some implementations, a user may customize what actionable content should be identified, which applications may utilize actionable content, which computing devices should identify actionable content, and/or which computing devices should have access to the actionable content for use. For example, a user may specify that phone numbers should not be sent to the second computing device 130 as actionable content. Also, for example, the user may specify that only phone numbers should be sent as actionable content. Also, for example, the user may specify that certain domains should not be analyzed for actionable content and/or that only certain domains should be analyzed for potentially actionable content. Also, for example, the user may specify that only certain categories of calendar entries and/or task entries should be analyzed for actionable content. Also, for example, the user may specify which application to associate with specific categories of actionable content. For example, the user may specify that all phone numbers should be sent to a phone dialing application and/or the user may specify that no phone numbers should be sent to a phone dialing application. Also, for example, the user may specify that addresses should be sent to a navigation application, but not sent to a contacts application. Also, for example, the user may specify that identified tasks should be sent to a task management application. Also, for example, the user may specify which of multiple computing devices to associate with specific categories of actionable content. For example, the user may specify that phone numbers should be sent to a mobile phone computing device, addresses should be sent to a computing device of a car that provides navigational capabilities, and/or that images should be sent to a media center computing device that serves as a user's repository for images.

In some implementations, permissions and/or customizations of functionality may be provided. For example, the user may set permissions and/or customize functionality through the browser 110, another application executing on the computing device 105, and/or an application executing on the second computing device 130. For example, a pop-up window on the computing device 105 may query the user regarding whether to transmit identified actionable content to the second computing device 130. In some implementations, the second computing device 130 may be utilized to query the user regarding whether to display actionable content, whether to poll and/or receive actionable content from communication server 125 and/or content submission engine 120, and/or whether to establish and/or maintain communication with the communication server 125 and/or content submission engine 120. In some implementations, the user may not be prompted each time actionable content is available and/or each time actionable content is identified. For example, the user may set preferences when communication with the communication server 125 is first established and may not be prompted each time actionable content is available.

Actionable content recognition engine 115 and/or content submission engine 120 may be integrated into one or more applications executing on computing device 105 and/or second computing device 130. For example, in some implementations the actionable content recognition engine 115 and/or the content submission engine 120 may be executed utilizing browser 110. In some implementations, one or more of the modules in FIG. 1 may be part of a plug-in executing on browser 110. For example, one or more of the modules in FIG. 1 may be extensions of browser 110 that have been installed by the user. Also, for example, one or more modules in FIG. 1 may be integrated as standard features on browser 110. In some implementations, one or more of the modules of FIG. 1 may be implemented through client-side executable scripts, such as JavaScript files that are embedded in the HTML of a webpage. In some implementations, such as those wherein the second computing device 130 may additionally and/or alternatively identify actionable content and provide the actionable content to the first computing device 105 for use, actionable content recognition engine 115 and/or content submission engine 120 may be integrated into one or more applications executing on second computing device 130.

In some implementations, the actionable content recognition engine 115 and/or the content submission engine 120 may additionally and/or alternatively be executing remotely, such as on communication server 125 and/or one or more additional remote servers. For example, a user may access a document on computing device 105. In some implementations, computing device 105 may send content to the actionable content recognition engine 115, which is executing on communication server 125 and/or an additional remote server. In some implementations, computing device 105 may send an identifier of the document accessed by the user to the actionable content recognition engine 115, which may be executing on communication server 125 and/or on an additional remote server. The actionable content recognition engine 115 may use the provided identifier to access the document and/or the communication server 125 may use the identifier to access the document and provide the document and/or content from the document to actionable content recognition engine 115. The actionable content recognition engine 115 may identify potentially actionable content in the document, the content submission engine 120 may determine the confidence level associated with potentially actionable content, and the communication server 125 may provide the second computing device 130 and/or another computing device with the actionable content.

Actionable content recognition engine 115 may receive data from the computing device 105 and/or the browser 110 to determine whether one or more documents accessed via computing device 105 contain content that may be actionable on the second computing device 130 and/or one or more additional computing devices. In some implementations, actionable content recognition engine 115 may additionally and/or alternatively receive data from the second computing device 130 to determine whether one or more documents accessed via computing device 130 contain content that may be actionable on the computing device 105 and/or one or more additional computing devices.

In some implementations, the data may be the contents of a document, metadata associated with the document, search terms provided by the user to arrive at the document, and/or a document identifier. For example, the data for a webpage may be the contents of the webpage, metadata associated with the webpage, search terms entered by the user to arrive at the webpage, and/or a document identifier of the webpage. In some implementations, a document identifier may include the URL, a file location on a computing device, and/or an address to a record in a database. Actionable content recognition engine 115 may identify content that is in a recognized format for one or more types of content that is actionable on a computing device such as the second computing device 130. For example, the actionable content recognition engine 115 may locate content in the format of a telephone number, such as "(XXX)XXX-XXXX" or "XXX-XXX-XXXX," wherein X represents an alphanumeric character. Actionable content recognition engine 115 may recognize the string of alphanumeric characters as a telephone number, which may be actionable on a computing device such as the second computing device 130 (e.g., utilizing a phone dialing application). Also, for example, the actionable content recognition engine 115 may recognize an alphanumeric string that contains an "@" and ends in ".com." The actionable content recognition engine 115 may identify the alphanumeric string as an email address, which may be actionable with an email application or other application on a computing device such as second computing device 130. Also, for example, the actionable content recognition engine 115 may recognize an e-mail that includes an invitation to a particular event, along with a time of the event and an address associated with the event. The actionable content recognition engine 115 may identify the contents of the e-mail as an event invitation, which may be actionable with a calendar application on a computing device such as second computing device 130 and/or actionable with a navigation application on a computing device such as second computing device 130.

In some implementations, the actionable content recognition engine 115 may identify actionable content based on one or more words and/or phrases present in a document. For example, actionable content recognition engine 115 may analyze the content of active webpages and/or other documents and determine that the content contains actionable content based on words and/or phrases that appear in the content and appear commonly in other documents with actionable content. In some implementations, actionable content recognition engine 115 may identify key words and/or phrases, for example, in the title of a document, in the identifier of a document, and/or in metadata associated with a document. Also, for example, the actionable content recognition engine 115 may identify words and/or phrases that are likely of importance based on term frequency inverse document frequency; format; and/or the style of any displayed words, such as headings, words in bold, italicized words, and/or underlined words. For example, the actionable content recognition engine 115 may determine that content located on a webpage may be contact information based on the presence of "Contact Us" in the title of the webpage. The content recognition engine 115 may determine such content will be used by a user on a computing device such as the second computing device 130 and further search the webpage for potential actionable content. In some implementations, the actionable content recognition engine 115 may identify actionable content based on comparison of one or more words in a document with an index of words that frequently appear in the same document as actionable content. For example, a webpage that contains the words "Contact Us" is likely to have contact information that is actionable on one or more computing devices. Also, for example, a document that contains certain action words such as "call", "cancel", "confirm", "schedule", and/or "reserve" may be likely to contain content that is directly actionable on one or more computing devices and/or that may be utilized to identify content that is actionable on one or more computing devices.

In some implementations, the actionable content recognition engine 115 may additionally and/or alternatively identify actionable content based on data embedded in a document. For example, the actionable content recognition engine 115 may identify actionable content based on data embedded in a webpage displayed utilizing the browser 110. For example, an XML tag may be embedded in a webpage and the XML tag may direct actionable content recognition engine 115 to specific content of the webpage. For example, a webpage may identify content using the tag "<contact>" to identify contact information contained between the tags. Also, for example, a webpage may use the tag "<phone number>" to identify the presence of a phone number between the tags. Additional and/or alternative tags may be present in the metadata of a webpage or other document and utilized by actionable content recognition engine 115 to identify actionable content on the webpage.

In some implementations, actionable content may be identified based on information contained within standard HTML tags embedded in a webpage. For example, an anchor HTML tag may contain a description of the content type (e.g., "phone_number"), the actionable content (e.g., "XXX-XXX-XXXX," where the X's denote a phone number), and/or the application to associate with the actionable content in the tags (e.g., "phone dialer"). In some implementations customized tags may be provided for use with the actionable content submission engine 120, which inform the actionable content recognition engine 115 of the location of actionable content.

In some implementations, embedded tags in a webpage or other document may contain information regarding potentially actionable content to send to one or more server-side applications for processing. For example, a web server may send actionable content that has been tagged on a webpage to content submission engine 120, communications server 125, and/or actionable content recognition engine 115, when the webpage is transmitted to the browser 110 for display to the user. In some implementations, one or more tags embedded in a webpage may call one or more client-side scripts to process potentially actionable content. For example, an anchor tag in a webpage may contain a function call to a JavaScript function to process actionable content contained within a tag and/or between tags, and/or a JavaScript function embedded in the webpage may automatically process potentially actionable content when the webpage is transmitted to the user. Embedded client-side scripts may include one or more steps of the methods described herein as executed by actionable content recognition engine 115 and/or content submission engine 120.

In some implementations, actionable content recognition engine 115 may additionally and/or alternatively identify actionable content based on a document identifier such as, for example, a URL. For example, in some implementations, the actionable content recognition engine 115 may determine a document contains actionable content based on one or more words in a document identifier for that document. For example, the webpage "http:/www.store.com/contact.html" may likely contain content related to contact information. Actionable content recognition engine 115 may recognize the word "contact" and search the active webpage to locate potentially actionable content. For example, actionable content recognition engine 115 may look for content in a format that is likely to be contact information, such as, for example, a phone number, address, store name, and/or email address. In some implementations, the actionable content recognition engine 115 may use one or more additional sources in addition to or instead of an active document to determine the presence of potentially actionable content. For example, the actionable content recognition engine 115 may recognize that the webpage that is active in the browser 110 contains an address and the user has also accessed a mapping webpage or application to search for the address on the computing device 105, the second computing device 130, and/or other computing device. The mapping webpage or application may be accessed either concurrently with the webpage containing the address or within a threshold time period from accessing the webpage containing the address. The actionable content engine 115 may determine that the active webpage and/or the previously accessed mapping webpage both referenced the address and identify the address as actionable content. In some implementations actionable content engine 115 may be more likely to identify content that is accessed on multiple webpages, through multiple applications, and/or through multiple computing devices as actionable content. In some implementations, the actionable content recognition engine 115 may determine actionable content based on one or more links on a webpage and/or the URLs associated with links on the webpage.

In some implementations, the actionable content recognition engine 115 may identify actionable content based on compiled indices or other databases of actionable content that are based on previous identification by one or more components. For example, the URL of a webpage may be associated with an index containing actionable content that has been previously identified on the webpage. Also, for example, a database may include a plurality of entities, with one or more of the entities each being be mapped to actionable content associated with the entity. In some implementations, indices or other databases may be compiled based on historical usage by previous users. For example, if previous viewers of a webpage may have identified particular content as actionable content and/or utilized a second computing device to access particular content of a document while viewing the document, the particular content may be identified as actionable content. In some implementations, a crawler may be utilized to identify potentially actionable content in documents and index the actionable content with the documents for later use with the actionable content engine 115.

In some implementations the actionable content recognition engine 115 may additionally and/or alternatively identify actionable content in an accessed document based on one or more search terms used to arrive at the accessed document. For example, entering the search terms "phone number store1" may indicate to the actionable content recognition engine 115 that the resulting document will likely contain a phone number associated with "store1." For example, search results identified in response to the search may contain the phone number associated with "store1." In some implementations, the actionable content recognition engine 115 may identify one or more instances of actionable content in a document based on the likelihood that the document contains actionable content. In some implementations, the actionable content recognition engine 115 may identify actionable content irrespective of search terms entered by the user and/or the likelihood that the document contains actionable content.

In some implementations, the actionable content recognition engine 115 may associate additional information with potentially actionable content. For example, a user who enters the search terms "phone number store1" may likely be searching for the phone number of Store1. The actionable content recognition engine 115 may additionally associate Store1 as a characteristic and/or identifier of a phone number that is identified in the resulting webpage. Also, for example, the actionable content recognition engine 115 may identify additional information to associate with located actionable content based on an index, metadata markers, URLs, and/or additional content on the webpage. For example, the actionable content recognition engine 115 may identify content between the XML tags "<store name>" as an identifier of the actionable content on the webpage. Also, for example, the actionable content recognition engine 115 may determine that the domain name of a website may be a likely indication of a characteristic and/or identifier of the actionable content. For example, "store1" may be identified as the source for actionable content from a website with the domain name "www.store1.com." Also, for example, the actionable content recognition engine 115 may identify an entity associated with the actionable content and associate a property of that entity as an identifier of the actionable content. For example, the most popular alias associated with an entity may be utilized as an identifier of the actionable content.

The actionable content recognition engine 115 may determine potentially actionable content based on previous actions of the user to arrive at a document. In some implementations, the actionable content recognition engine 115 may identify the path that the user traversed to find an accessed document. For example, a user may type a URL for a webpage into browser 110. Once on the webpage, the user may click on a link entitled "Contact Us" and be taken to a contact page. Actionable content recognition engine 115 may recognize that a user is seeking out contact information and determine that content on the resulting webpage may be useful on an additional computing device such as the second computing device 130. Actionable content recognition engine 115 may utilize one or more methods described herein to determine potentially actionable content on the resulting webpage. For example, actionable content recognition engine 115 may determine that the user is interested in contact information based on the displayed text of a hyperlink (e.g., "Contact Us") and/or on a part of the text of the URL (e.g., http://www.store.com/contact_us.html). In some implementations, the actionable content recognition engine 115 may recognize that the user has visited the same webpage multiple times and determine that the user may have interest based on the frequency of visiting the webpage. In some implementations, the actionable content recognition engine 115 may utilize a bookmarking function and/or other flagging function to suggest actionable content based on documents that have been bookmarked by the user. For example, a user may bookmark a specific webpage and the actionable content recognition engine 115 may identify the webpage and send the URL of the webpage and/or content of the webpage as potential actionable content. Also, for example, a user may download a specific user manual and the actionable content recognition engine 115 may identify the user manual and send the URL of the user manual and/or content of the user manual as potential actionable content. In some implementations, the actionable content recognition engine 115 may identify a document as containing potential actionable content based on the number of links to the document. For example, a webpage that has been linked to multiple times may be more likely to contain important content and may be more likely to have content that is of interest to the user.

In some implementations, actionable content recognition engine 115 may determine potentially actionable content and/or additional information based on information in the text of the link of the referring webpage to the current webpage. For example, a user may enter "phone number StoreName" as search terms and be directed to a search results page. The URL of the search results page may have an indication of the search terms that were entered to arrive at the search results page. For example, the search results page may have a URL such as "www.searchengine.com/search terms=phone number+StoreName." Actionable content recognition engine 115 may examine the URL of the search results page that referred the user to a content page to identify potentially actionable content and/or additional associated information that may be located on the resulting page. Actionable content recognition engine 115 may also determine what content may be desired by the user based on the uniqueness of content in a displayed webpage and/or document. For example, a webpage may display multiple phone numbers, such as a webpage phone directory. Actionable content recognition engine 115 may determine that the page contains too many phone numbers to determine which, if any, phone numbers on the page are of interest to the user. Because the page does not contain a minimal number of phone numbers, the actionable content recognition engine 115 may not suggest any of the phone numbers.

In some implementations, the actionable content recognition engine 115 may use one or more indications from the user to determine what actionable content on a page may be of interest to the user. For example, a user may show interest in a particular phone number based on the location of a cursor on the webpage, by zooming in on a particular phone number, by scrolling to a particular phone number, and/or by highlighting a phone number. Also, for example, a user may show interest in a particular phone number based on past searches, past browsing history, and/or other actions of the user. For example, one or more of the phone numbers may be associated with a particular entity that has been associated with documents of past searches of the user, a particular entity that has been associated with queries of past searches of the user, and/or that has been associated with past documents to which the user has navigated. Additionally or alternatively, the actionable content recognition engine 115 may associate information located near actionable content as an indication of potentially useful content. For example, a user may use the search terms "phone number store1 location1" and be directed to a webpage containing multiple locations of store1. Actionable content recognition engine 115 may determine that the phone number near an indication of location1 may be of interest to the user and identify the corresponding phone number as actionable content. In some implementations, all actionable content from a page containing multiple instances may be provided as actionable content to the content submission engine 120.

In some implementations, the actionable content recognition engine 115 may identify other data in a document that may be associated with actionable content as a characteristic and/or identifier of the actionable content. For example, the actionable content recognition engine 115 may identify an entity that is the source of potentially actionable content on a webpage and associate an alias of the entity as an identifier of the actionable content. For example, the actionable content recognition engine 115 may determine identifiers and/or characteristics that are likely of importance based on term frequency inverse document frequency; the domain name of the URL of a webpage; words and/or phrases in headers and/or footers of the document; the style of words and/or phrases; and/or words in the title of a document and/or webpage. The identifier and/or characteristic may be transmitted with the actionable content to one or more components and may be used to annotate the actionable content with other content and provide the user with information about the actionable content.

In some implementations, actionable content recognition engine 115 may identify potentially actionable content and/or additional associated information in a document that is actively displayed to a user. For example, a web browser may allow multiple webpages to be opened at one time through the use of tabs and/or through multiple instances of the web browser executing on the computing device, and actionable content recognition engine 115 may be informed by the web browser of the webpage that is currently being displayed to the user. Actionable content recognition engine 115 may identify potentially actionable content from only the active document and/or from all open documents, regardless of whether the documents are currently displayed to the user. In some implementations, actionable content recognition engine 115 may determine potentially actionable content from web pages that are actually visible to the user on the computing device 105 and/or the second computing device 130.

In some implementations actionable content recognition engine 115 may identify potentially actionable content and/or additional associated information in a document that is provided to a user based on identification of one or more entities in the document and identification of one or more properties associated with the entity. For example, actionable content recognition engine 115 may identify an alias and/or additional information associated with an entity within a document such as a webpage, a user calendar entry, or a user task entry. The content recognition engine 115 may identify the entity that is associated with the alias and/or additional information via accessing one or more database such as an entity database. One or more additional properties associated with the entity, additional entities associated with the entity, and/or one or more additional properties associated with associated entities may be utilized as actionable content. For example, an alias associated with the entity for "Business 1" may be identified from a calendar entry for "Contact Business 1 to schedule appointment" and utilized to identify the entity associated with "Business 1". Business 1's phone number may be identified based on an entity database and/or other database, and may be utilized as the actionable content.

In some implementations entities are topics of discourse. In some implementations, entities are persons, places, concepts, and/or things that can be referred to by a text fragment (e.g., a term or phrase) and are distinguishable from one another (e.g., based on context). For example, the text "bush" on a webpage may potentially refer to multiple entities such as President George Herbert Walker Bush, President George Walker Bush, a shrub, and the rock band Bush. In some implementations an entity may be referenced by a unique entity identifier that may be used to identify the entity. The unique entity identifier may be associated with one or more properties associated with the entity and/or with other entities. For example, in some implementations one or more entity database may include properties associated with unique identifiers of one or more entities. For example, for each of a plurality of entities, a mapping (e.g., data defining an association) between the entities and one or more properties and/or other entities related with the entity may be identified in the entity database. For example, a unique identifier for the entity associated with "Business 1" may be associated with a name or alias property of "Business 1", another alias property of "Business 1+" (an alternative name by which Business 1 is often referenced), a phone number property of "123-456-7891", an address property of "1234 example address, example city, example state", and/or an entity type property of "business" in the entity properties database. Additional and/or alternative properties may be associated with an entity in one or more databases such as an entity database. In this specification, the term "database" will be used broadly to refer to any collection of data. The data of the database does not need to be structured in any particular way, or structured at all, and it can be stored on storage devices in one or more locations. Thus, for example, the database may include multiple collections of data, each of which may be organized and accessed differently.

In some implementations actionable content recognition engine 115 may identify potentially actionable content based on mappings between multiple entities and/or mappings between entities and one or more entity properties. The content recognition engine 115 may identify the entities and/or entity properties via accessing one or more database such as an entity database. For example, an entity database may include one or more knowledge graphs mapping entities and entity properties and/or entities and other entities. In some implementations actionable content recognition engine 115 may determine likely actionable content based on mappings between multiple entities and/or entities and entity properties, in combination with artificial intelligence having predictive capabilities. For example, in some implementations one or more mappings between two or more entities may define relationships between the entities that may be utilized to determine actionable content. For example, a calendar entry may include the terms "call Business 1." Based on the terms, an entity associated with "Business 1" and an entity associated with the concept of "calling" may be identified. The two entities may be mapped together via the phone number that may be called to reach Business 1. For example, the phone number may be mapped to the entity associated Business 1 as a property of Business 1 and mapped to the entity associated with "calling" as a function that may be performed with the phone number. Based on such a mapping, it may be predicted that the phone number is actionable content for the text "call Business 1". In some implementations a likelihood that identified actionable content is the correct actionable content may be determined and optionally utilized in determining a confidence level associated with the actionable content.

Also, for example, a calendar entry may include the text "cancel service with Business 1" and/or a spoken input by a user may be identified as "cancel service with Business 1". The terms "cancel service" may indicate a predicted service cancellation action and the text "Business 1" may indicate the service cancellation action is related to an entity associated with "Business 1". A service cancellation action may be associated with certain properties associated with an entity such as, for example, one or more phone numbers that may be called to cancel service, one or more e-mail addresses that enable cancellation of service, and/or one or more webpages that enable cancellation of service. A mapping between an entity associated with "Business 1" and properties of that entity that may indicate one or more phone numbers related to that entity that may be called to cancel service, one or more e-mail addresses related to that entity that enable cancellation of service, and/or one or more webpages related to that entity that enable cancellation of service may be identified. One or more of the mapped properties may be identified as actionable content. For example, a webpage that enables cancellation of service and is mapped to the entity associated with "Business 1" may be identified as actionable content. In some implementations a likelihood that identified actionable content is the correct actionable content may be determined and optionally utilized in determining a confidence level associated with the actionable content. Additional and/or alternative methods of identifying actionable content based on mappings between multiple entities and/or entities and properties in combination with artificial intelligence having predictive capabilities may be utilized.

One or more of the methods described to determine the presence of actionable content in an accessed document such as a displayed document and/or webpage of a user may additionally or alternatively be utilized to determine a confidence level that the actionable content should be submitted to one or more other computing devices of the user. For example, a confidence level that actionable content accessed on first computing device 105 of a user should be submitted to the second computing device 130 of the user and/or other computing devices of the user may be determined. Also, for example, a confidence level that actionable content accessed on second computing device 130 of a user should be submitted to the first computing device 105 of the user and/or other computing devices of the user may be determined. Also, for example, a confidence level that actionable content accessed on first computing device 105 of a user and second computing device 130 of a user should be submitted to one or more other computing devices of the user may be determined.

The first computing device 105 of the user, the second computing device 130 of the user, and other computing devices of the user may each be separate computing devices. For example, each computing device may have its own network interface subsystem that provides an interface to one or more networks such as network 101 to enable communication with one or more other computing devices. Networks may include, for example, the Internet, one or more local area networks (LANs), one or more wide area networks (WANs), and/or one or more mobile networks. Any networks may optionally utilize one or more standard communications technologies, protocols, and/or inter-process communication techniques. For example, in some implementations the first computing device 105 may be a desktop computing device of the user and the second computing device 130 may be a mobile phone of the user. Also, for example, in some implementations the first computing device 105 may be a desktop computing device of the user and the second computing device 130 may be another desktop computing device of the user. In some implementations the first computing device 105, the second computing device 130, and/or other computing devices of the user may include, for example, a tablet computing device, a computing device of a vehicle of the user (e.g., an in-vehicle communications system, an in-vehicle entertainment system, an in-vehicle navigation system), a wearable apparatus of the user that includes a computing device (e.g., a watch of the user having a computing device, glasses of the user having a computing device). Additional and/or alternative computing devices of the user may be provided. In some implementations each computing device may optionally be associated with a unique identifier such as a unique IP address, a unique MAC address, etc. In some implementations one or more computing devices may have one or more identifier in common.

Computing devices may be associated with a user utilizing one or more methods and/or apparatus. For example, in some implementations a user may be referenced by a unique entity identifier that may be used to identify the user. The unique entity identifier of the user may be associated with one or more entity identifiers for computing devices associated with the user. For example, in some implementations one or more database may include computing devices that are associated with unique identifiers of one or more users. For example, for each of a plurality of users, a mapping (e.g., data defining an association) between the user and one or more computing devices of the user may be provided. For example, a user may be mapped with one or more desktop computing devices the user utilizes, one or more mobile phones the user utilizes, one or more tablets the user utilizes, one or more wearable computing devices the user utilizes, and/or one or more in-vehicle computing devices the user utilizes. In some implementations one or more of the computing devices may be mapped to multiple users. For example, a desktop computing device may be mapped to multiple users. In some implementations data identified via one or more user actions via the computing device may be utilized to determine when a particular user is utilizing the computing device. For example, in some implementations a particular user may "log in" to the computing device, one or more applications executing on the computing device, and/or one or more services via the computing device utilizing a password, a pass key, biometric identification, and/or other form of user verification to indicate the particular user is utilizing the computing device. For example, a user may log in to a social networking service via a particular computing device and data provided via the social networking service may be utilized to determine the user is utilizing the particular computing device.

Information identified by the actionable content recognition engine 115 may optionally be provided to the content submission engine 120 to determine the confidence level that the identified actionable content should be submitted to one or more computing devices associated with the user. For example, the content submission engine 120 may identify key words and/or phrases from a document, for example, in the title of the document, in the URL of a document, and/or in metadata associated with a document. Also, for example, the content submission engine 120 may identify words and/or phrases that are likely of importance in a document based on term frequency inverse document frequency; format; and/or the style of the displayed words, such as headings, words in bold, italicized words, and/or underlined words; and determine a confidence level based on one or more of the identified words and/or phrases. In some implementations, the content submission engine 120 may determine the confidence level based on one or more words and/or phrases provided by the actionable content recognition engine 115.

Content submission engine 120 may receive actionable content as determined by the actionable content recognition engine 115. Content submission engine 120 may determine whether actionable content received by the actionable content recognition engine 115 is content that the user would likely have interest in accessing on one or more computing devices. If the located actionable content is identified as content that is likely of interest to the user, the content submission engine 115 may alert one or more components.

In some implementations, content submission engine 120 may communicate with a communication server 125, which may also be in communication with one or more computing devices such as the computing device 105 and/or the second computing device 130. In some implementations, the content submission engine 120 may send identified actionable content to the communication server 125. In some implementations, content submission engine 120 may send a message to the communication server 125 that actionable content has been identified and is available for transmitting. In some implementations, content submission engine 120 may wait to be polled by communication server 125 on whether actionable content is available and/or the type of content that has been identified. In some implementations, the communication server 125 may optionally not be present and content submission engine 120 may directly communicate with one or more computing devices such as the computing device 105 and/or the second computing device 130. Content submission engine 120 may directly transmit actionable content one or more computing devices, send a notification to one or more computing devices that actionable content is available for transmission to the one or more computing devices if requested, and/or wait to be polled by the one or more computing device.

Content submission engine 120 may determine a confidence level that the actionable content identified by the actionable content recognition engine 115 is likely to be content that the user will have interest in accessing on one or more computing devices such as the computing device 105 and/or the second computing device 130. In some implementations, the content submission engine 120 may identify the likelihood that the identified content is desirable to a user using one or more signals. For example, in some implementations, the content submission engine 120 may use term frequency inverse document frequency, historical usage of a document by other users, historical usage of a document by the current user, prominent formatting of words in a document, search terms used to arrive at a document, and/or one or more signals related to the importance of potentially actionable content in a document.

For example, the content submission engine 120 may identify that the actionable content is prominently displayed in a document and/or comprises a significant portion of the content of the document, and assign a confidence level based on such identification. Also, for example, the content submission engine 120 may identify a use for actionable content that is formatted in bold in a document, such as "Contact Address" and/or "Contact Phone Number." Content submission engine 120 may identify "address" and/or "phone number" as uses for actionable content and may assign actionable content located near the bolded text a confidence level that is more likely to satisfy a threshold when the actionable content is used as an address and/or phone number. Also, for example, actionable content identified in small print at the bottom of a webpage may be assigned a confidence level that is less likely to satisfy a threshold based on the less prominent formatting of the actionable content.

Content submission engine 120 may additionally and/or alternatively identify a use for actionable content based on search terms used to arrive at a document and assign a confidence level based on the use. For example, the content submission engine 120 may identify both an address and a phone number as actionable content on a webpage. Content submission engine 120 may assign the address a confidence level that is more likely to satisfy a threshold than the confidence level assigned to the phone number when the user included the word "address" in the search terms used to arrive at the webpage. In some implementations, content submission engine 120 may only provide an address when "address" is used as a search term.

In some implementations, the content submission engine 120 may determine a potential use and/or a confidence level based on key words and/or phrases present, for example, in the title of the document, in the document identifier (e.g., URL) of a document, and/or in metadata associated with a document. Also, for example, the content submission engine 120 may determine a potential use and/or a confidence level based on words and/or phrases using term frequency inverse document frequency; format; and/or the style of the displayed words, such as headings, words in bold, italicized words, and/or underlined words. In some implementations, the content submission engine 120 may determine a potential use and/or a confidence level based on one or more words and/or phrases provided by the actionable content recognition engine 115.

In some implementations, content submission engine 120 may additionally and/or alternatively utilize information from one or more computing devices to which actionable content may be provided in determining a confidence level of interest in the actionable content for one or more of the computing devices. For example, content submission engine 120 may receive information from the second computing device 130 about the actions of a user on such computing devices. For example, the content submission engine 120 may receive information directly via the communication network 101 and/or through communication server 125. Content submission engine 120 may determine the likelihood that the user is interested in accessing the identified actionable content based on the user's actions on the second computing device 130. For example, the second computing device 130 may transmit information indicative of the application currently being accessed on the second computing device 130 and transmit that information to the content submission engine 120. Content submission engine 120 may determine the confidence level of a user interest in the actionable content based on the application being accessed. For example, the actionable content recognition engine 115 may identify a phone number as potential actionable content. Content submission engine 120 may receive an indication from the second computing device 130 that the user is accessing a telephone number dialer application on the second computing device 130. In some implementations, because the actionable content is a phone number, the content submission engine 120 may determine that the confidence level satisfies a threshold confidence level and that the phone number displayed to a user on the browser 110 is content that the user would like to access on the second computing device 130.

In some implementations, content submission engine 120 may additionally and/or alternatively utilize information about one or more computing devices to which actionable content may be provided in determining a confidence level of interest in the actionable content for one or more of the computing devices. For example, content submission engine 120 may receive information about each of multiple computing devices with which a user is associated. For example, the content submission engine 120 may receive information from a database that associates the user with multiple computing devices directly via the communication network 101 and/or through communication server 125. Content submission engine 120 may determine the likelihood that the user is interested in accessing the identified actionable content on a given computing device based on information about the computing device. For example, one or more capabilities of the computing device may be identified and/or one or more applications accessible on the computing device may be identified to determine if certain actionable content may be utilized by the computing device. For example, an in-vehicle computing device may have navigation functionality and it may be determined that actionable content associated with an address may be utilized by such a computing device. Also, for example, a mobile phone computing device may have phone dialing functionality and a tablet computing device may not have phone dialing functionality and it may be determined that actionable content associated with a phone number may be utilized by the mobile phone, but not by the tablet. Also, for example, it may be determined a tablet computing device has phone dialing functionality (e.g., it may be determined the tablet has a phone dialing application installed) and it may be determined that actionable content associated with a phone number may be utilized by the tablet. Also, for example, a mobile phone computing device may have phone dialing functionality and a tablet computing device may also have phone dialing functionality and it may be determined that actionable content associated with a phone number is more likely to be utilized by the mobile phone computing device than the tablet computing device.

In some implementations, content submission engine 120 may additionally and/or alternatively utilize information about historical usage of one or more computing devices to which actionable content may be provided in determining a confidence level of interest in the actionable content for one or more of the computing devices. Historical usage may be specific to the user of the computing device and/or based on historical usage of other users of the computing device and/or similar computing devices. For example, content submission engine 120 may receive information about historical usage of each of multiple computing devices with which a user is associated. For example, the content submission engine 120 may receive information from a database that associates one or more users with computing devices directly via the communication network 101 and/or through communication server 125. Content submission engine 120 may determine the likelihood that the user is interested in accessing the identified actionable content on a given computing device based on information about historical usage of the computing device. For example, a user's historical usage of a computing device may be identified to determine if certain actionable content may likely be utilized by the computing device. For example, a user's historical usage of an in-vehicle computing device may identify that the user often makes phone calls utilizing such in-vehicle computing device (optionally in combination with a mobile phone computing device of the user). Based on such an identification, actionable content associated with a phone number may be identified as likely to be utilized by the in-vehicle computing device. Also, for example, a user's historical usage of a mobile phone computing device may identify that the user often utilizes such device to set and manage calendared events. Based on such an identification it may be determined that actionable content associated with an event (e.g., as identified via a social network invitation and/or an e-mail invitation) as likely to be utilized by the mobile phone. Also, for example, a user's historical usage of a mobile phone computing device may identify that the user rarely utilizes such device to perform operations that consume large amounts of data. Based on such an identification it may be determined that actionable content that would result in large amounts of data being consumed as less likely to be utilized by the mobile phone. Also, for example, a user's historical usage of a mobile phone computing device may identify that the user often utilizes such device to set and manage calendared events, but a user's historical usage of a tablet computing device may identify that the user rarely utilizes such device to set and manage calendared events. Based on such an identification it may be determined that actionable content associated with an event as likely to be utilized by the mobile phone computing device, but not likely to be utilized by the tablet computing device.

Also, for example, historical usage of multiple users of computing devices similar to a computing device of a user may be identified to determine if certain actionable content may likely be utilized by the computing device. A computing device may be identified as similar to another computing device based on one or more factors such as, for example, a computing device type (e.g., mobile phone computing device, in-vehicle computing device, tablet computing device) and/or more granular similarity measures. For example, particular models and/or categories of mobile phone computing devices may be identified as similar (e.g., smart phones having functionalities A, B, and C; smart phones from manufacturer A; smart phones that are utilized by the user with at least a threshold frequency; and/or smart phones that include applications A and B). For example, historical usage of multiple users of an in-vehicle computing device of a particular car model may identify that users often makes phone calls utilizing such in-vehicle computing device. Based on such an identification, actionable content associated with a phone number may be identified as likely to be utilized by the in-vehicle computing device. Also, for example, historical usage of all mobile phone computing devices may identify that users often utilizes such device to set and manage calendared events. Based on such an identification it may be determined that actionable content associated with an event as likely to be utilized by the mobile phone computing device.

In some implementations, content submission engine 120 may additionally and/or alternatively utilize information about one or more computing devices from which actionable content is identified in determining a confidence level of interest in the actionable content. For example, content submission engine 120 may receive information about each of multiple computing devices with which a user is associated. For example, the content submission engine 120 may receive information from a database that associates the user with multiple computing devices directly via the communication network 101 and/or through communication server 125. Content submission engine 120 may determine the likelihood that the user is interested in accessing the identified actionable content on one or more computing device based on information about one or more given computing devices from which the actionable content was identified. For example, one or more capabilities of the computing device may be identified and/or one or more applications accessible on the computing device may be identified to determine if certain actionable content is likely to be utilized on another computing device besides the one or more computing devices from which the actionable content was identified. For example, it may be identified that a desktop computing device of a user may not have phone dialing capabilities, may not have a phone dialing application installed, or may only have minimally utilized phone dialing applications installed. Based on such identification it may be determined that actionable content associated with a phone number is more likely to be utilized by one or more other computing devices of the user than it is to be utilized by the desktop computing device. Also, for example, a mobile phone computing device may be associated with a restrictive data plan. Based on such a determination it may be determined that actionable content associated with consumption of large amounts of data is more likely to be utilized by one or more other computing devices of the user than it is to be utilized by the mobile phone computing device.

In some implementations, content submission engine 120 may additionally and/or alternatively utilize information about historical usage of one or more computing devices from which actionable content is identified in determining a confidence level of interest in the actionable content. For example, a user's historical usage of a computing device may be identified to determine if certain actionable content may likely be utilized by other computing devices. For example, a user's historical usage of desktop computing device may identify that the user often sets and updates calendar entries utilizing such desktop computing device. Based on such an identification, actionable content identified on the desktop computing device that is associated with an event may be identified as less likely to be utilized by one or more other computing devices. Also, for example, a user's historical usage of a mobile phone computing device may identify that the user identify that the user rarely sets and updates calendar entries utilizing such mobile phone computing device. Based on such an identification it may be determined that actionable content associated with an event as likely to be utilized by one or more other computing devices. Historical usage of multiple users of computing devices similar to a computing device of a user may additionally and/or alternatively be utilized to determine whether actionable content should be sent to the communication server 125 and/or one or more computing devices of the user.

In some implementations, the content submission engine 120 may adjust the confidence level to be more likely to satisfy a threshold confidence level when associated potentially actionable content is more likely to be of interest to the user on another computing device. For example, in implementations where a greater confidence level is more likely to satisfy a threshold confidence level, the confidence level may be increased when the content submission engine 120 determines that the associated actionable content is more likely to be of interest to the user on the second computing device 130. For example, the actionable content recognition engine 115 may identify actionable content with a potential use as an address and usable with a mapping application on the second computing device 130. If the user accesses a mapping application on the second computing device 130, the content submission engine 120 may increase the confidence level associated with the located actionable content for the second computing device based on the likelihood that the user has interest in actionable content that may be utilized by a mapping application.

In some implementations, the content submission engine 120 determines a confidence level based on the period of time between a user accessing actionable content on one or more computing devices and the user accessing one or more applications on one or more other computing devices. For example, the content submission engine 120 may determine confidence level based on the period of time between a user accessing actionable content on the computing device 105 and the user accessing one or more applications on the second computing device 130. For example, content submission engine 120 may determine that the confidence level of actionable content satisfies a threshold confidence level when the time between viewing actionable content on computing device 105 and accessing the second computing device 130 is within a certain time interval. Also, for example, in some implementations, the content submission engine 120 may adjust the confidence level to be more likely to satisfy a threshold as the time between accessing the second computing device 130 and viewing actionable content on the computing device 105 decreases.

In some implementations, the content submission engine 120 may adjust the confidence level to be more indicative of a likelihood that the actionable content is of interest to the user on one or more computing devices while the document associated with the actionable content is still actively being accessed on one or more other computing devices. For example, in some implementations the content submission engine 120 may adjust the confidence level to be more indicative of a likelihood that the actionable content is of interest to the user when the second computing device 130 is accessed while the actionable content is still actively displayed on the computing device 105. For example, the user may access a webpage on browser 110 that displays an address of a retail store. Actionable content recognition engine 115 may determine that the address of the webpage is actionable on the second computing device 130 and that the content is likely an address. Content submission engine 120 may assign a confidence level to the actionable content that fails to satisfy a threshold that is required for the content to be provided to the second computing device 130. After a period of time, the second computing device 130 may transmit an indication to the communication server 125 that the user is accessing a mapping application. Content submission engine 120 may receive the indication and adjust the confidence level based on the time interval between the user accessing the content on the computing device 105 and accessing the mapping application on the second computing device 130. If the new confidence level satisfies the threshold, the content submission engine 120 may send the actionable content and/or a notification that actionable content is available, as described herein. In some implementations, the confidence level may satisfy the threshold confidence level only when the content is actively displayed and the mapping application is accessed concurrently.

Content submission engine 120 may determine one or more potential uses for actionable content received from the actionable content recognition engine 115. In some implementations, the potential uses may be received from the actionable content recognition engine 115. For each potential use associated with actionable content, content submission engine 120 may associate a different confidence level with each potential use based on the likelihood that each use for the content is the intended use. For example, a user may access content on browser 110 that the actionable content recognition engine 115 determines contains an address. Content submission engine 120 may identify that the address may be potentially used with a mapping application on the second computing device 130 or other computing device and/or with an address book application on the second computing device 130 or other computing device. Content submission engine 120 may determine that the address is likely for a retail store based on other indications associated with the address as described herein, such as a URL, search terms used to arrive at the webpage, an entity database, and/or metadata of the webpage. In some implementations, the content submission engine 120 may determine that it is more likely that the user has interest in accessing the address with a mapping application than with an address book application and adjust the confidence level for the use of the content with a mapping application to make it more likely to satisfy a threshold confidence level when a user accesses a mapping application than the confidence level assigned to the use of the actionable content with an address book application. Also, for example, the actionable content may be determined to be the address of a personal contact, based on other content near the address on the page that is indicative of a personal contact, such as a name, email address, and/or phone number. Content submission engine 120 may adjust the confidence level that the address should be used with an address book application to make it more likely that the confidence level will satisfy a threshold when a user accesses an address book application versus a mapping application.

Also, for example, a user may access content on browser 110 that the actionable content recognition engine 115 determines contains an address. Content submission engine 120 may identify that the address may be potentially used with the second computing device 130 and one other computing device. Content submission engine 120 may determine that the address is likely for a retail store based on other indications associated with the address as described herein. In some implementations, the content submission engine 120 may determine that it is more likely that the user has interest in accessing the address with a mapping application of the second computing device 130 than with a mapping application of the one other computing device, based on historical usage of the second computing device 130 that identifies the second computing device 130 as more likely to be utilized to map addresses than the one other computing device. Based on such a determination, the content submission engine 120 may adjust the confidence level for the use of the content with the second computing device 130 to make it more likely to satisfy a threshold confidence level when a user accesses the second computing device 130 than when the user accesses the one other computing device.

In some implementations, content submission engine 120 may identify potentially actionable content, additional associated information, potential uses for actionable content, and/or the likelihood that the user has interest in actionable content, based on the document or documents that are actively displayed to a user. For example, a web browser may allow multiple webpages to be opened at one time through the use of tabs and/or multiple instances of the browser, and content submission engine 120 may be informed of the webpage that is currently being displayed to the user. Content submission engine 120 may identify potentially actionable content, additional associated information, potential uses for actionable content, and/or the likelihood that the user has interest in actionable content, on one or more open webpages on the computing device 105, on the active webpage or webpages on the computing device 105, and/or on the webpage or webpages that are visible to the user on computing device 105.

In some implementations, the content submission engine 120 may transmit actionable content to one or more components, such as the computing device 105, the second computing device 130, other computing devices, and/or the communication server 125, when the confidence level associated with the actionable content satisfies a threshold level. In some implementations, the content submission engine 120 may transmit an identifier of actionable content. For example, the content submission engine 120 may identify a URL that links to actionable content and transmit the URL to one or more components. In some implementations, the content submission engine 120 may transform the actionable content and transmit the content in a different form. For example, the content submission engine 120 may identify an address as actionable content that is of interest to the user on the second computing device 130 and transmit the longitude and latitude of the address for use with a mapping application on the second computing device 130. Also, for example, the content submission engine 120 may annotate actionable content with one or more identifiers and/or characteristics and transmit the identifiers and/or characteristics with the actionable content. For example, the content submission engine 120 may identify an entity associated with actionable content based on annotations identified by the actionable content recognition engine 115 and provide the annotations with the actionable content. Also, for example, the content submission engine 120 may determine the entity based on term frequency inverse document frequency of the original document, the domain name of the URL of the original document, words and/or phrases in headers and/or footers of the document, the style of words and/or phrases in the original document, and/or words in the title of the original document and/or webpage. Also, for example, the content submission engine 120 may determine the entity based on a mapping of that entity to the document.

Communication server 125 may be in communication with the computing device 105, the second computing device 130, and/or the communication submission engine 120 via communication network 101 to determine when actionable content is available for one or more computing devices and/or when a user is accessing one or more computing devices and may be interested in actionable content. In some implementations, the communication server 125 may not be present and the content submission engine 120 may communicate directly with other computing devices such as the second computing device 130 via the communications network 101. In some implementations, the communication server 120 may receive actionable content, associated confidence levels, and/or one or more potential uses for actionable content from the content submission engine 120. In some implementations, communication server 125 may receive a signal from the content submission engine 120 that actionable content is available for retrieval.

Communication server 125 may poll one or more of a plurality of content submission engines 120 and/or receive actionable content from one or more content submission engines 120 to transmit to the second computing device 130. For example, a user may have multiple browsers 110 active on computing device 105. Each browser may have a separate instance of a content submission engine 120 and each may independently send actionable content to the communication server 125. In some implementations, the communication server 125 may be in communication with multiple other computing devices via communication network 101. For example, communication server 125 may be in communication with a mobile phone computing device and a tablet computing device. Communication server 125 may determine what actionable content, if any, to transmit to the mobile phone computing device and/or tablet computing device based on, for example, the timing and type of applications accessed on each of the computing devices.

Second computing device 130 and/or other computing devices may receive actionable content from communication server 125 and/or content submission engine 120 via communication network 101. The transmission of actionable content may be initiated by communication server 125 and/or by the second computing device 130 and/or other computing devices. In some implementations, actionable content may be sent to the second computing device 130 immediately when received by the communication server 125. In some implementations, the communication server 125 and/or the content submission engine 120 may initially send a notification to the second computing device 130 that actionable content is available. For example, the content submission engine 120 may determine that an address identified by the actionable content recognition engine 115 has a confidence level that satisfies a threshold for submission to the second computing device 130. Communication server 125 may send a notification to the second computing device 130 that the content is available, that the content is an address, and/or that the content is associated with one or more applications on the second computing device 130. In some implementations, the second computing device 130 may contact the communication server 125 and/or the content submission engine 120 when the user accesses an application on the second computing device 130 where actionable content may be utilized. For example, a user may initiate a mapping application on the second computing device 130. Second computing device 130 may contact communication server 125 to determine whether actionable content associated with the mapping application is available. Also, for example, the second computing device 130 may request actionable content that has a potential use that matches the application that the user is accessing via the second computing device 130. In some implementations, the second computing device 130 may poll the communication server 125 and/or content submission engine 120 periodically and/or continuously to determine whether actionable content is available for transmission. In some implementations, the second computing device 130 may poll communication server 125 and/or content submission engine 120 only when the user has indicated that actionable material may be utilized, such as, for example, when the second computing device 130 is accessed and/or when an application that may utilize actionable content is accessed. In those implementations, the second computing device 130 may poll the communication server 125 and/or the content submission engine 120 continuously and/or periodically to determine whether actionable content is available for transmission to the second computing device 130.

Figure 6:
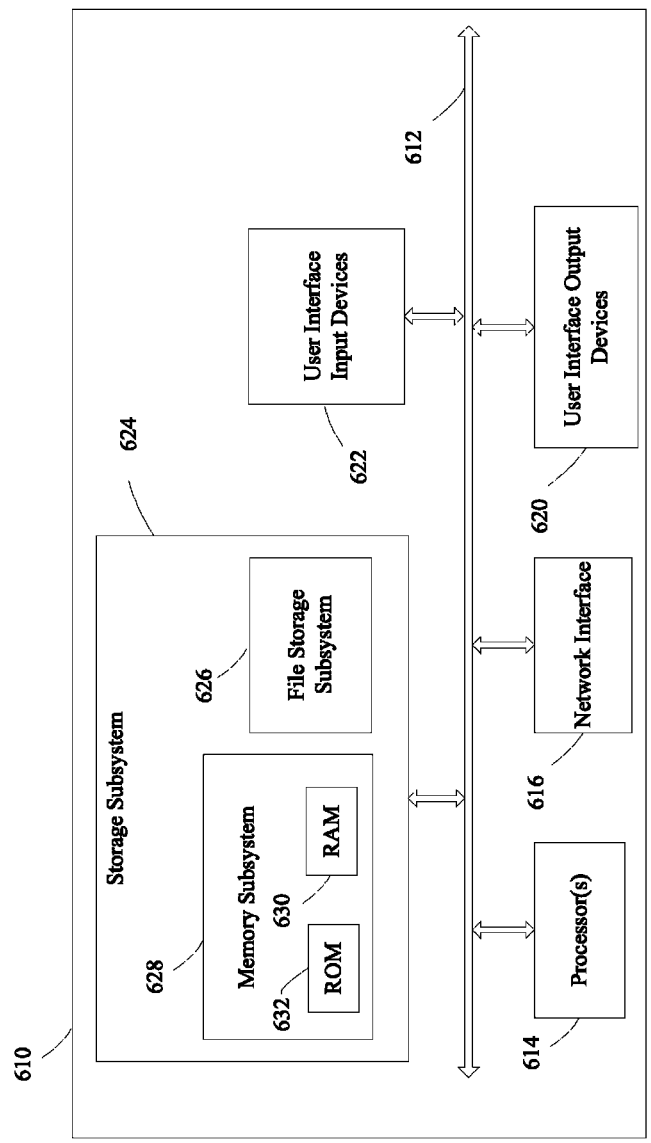
FIG. 6 illustrates a block diagram of an example computing device.

In some implementations, one or more components depicted in FIG. 1 may not be present and/or one or more additional components may be present. For example, communication server 125 may not be present and/or content submission engine 120 may directly communicate with the second computing device 130 via communication network 101. In some implementations, actionable content recognition engine 115, content submission engine 120, and/or communication server 125 may be in communication with multiple computing devices in addition to computing devices 105 and 130 and/or multiple applications on computing devices. In some implementations, one or more components depicted in FIG. 1 may be combined into a single component and/or may be incorporated into communication server 125, computing device 105, a plug-in on browser 110, and/or on second computing device 130. For example, in some implementations actionable content recognition engine 115, content submission engine 120, and/or communication server 125 may be combined into a single computing device having an architecture that may share one or more aspects with the computing device architecture as illustrated in FIG. 6.

Figure 2:
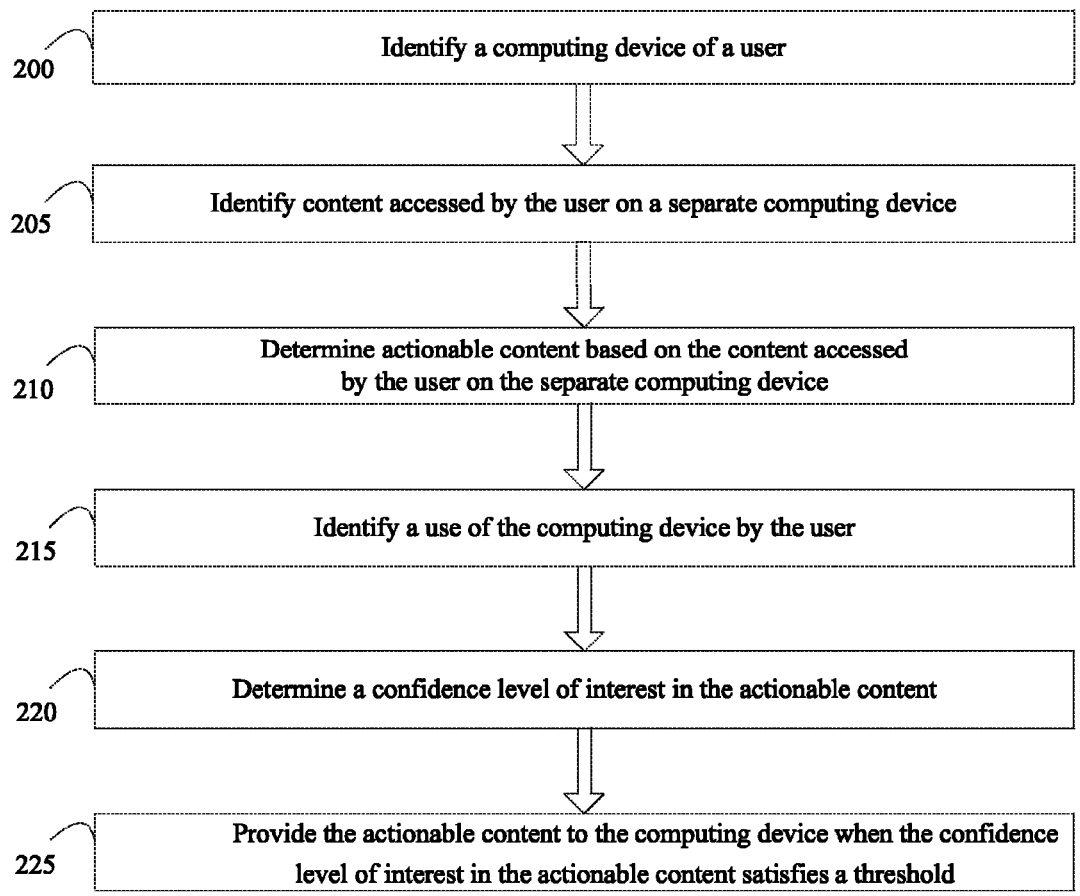
FIG. 2 is a flow chart illustrating an example method of providing actionable content to a computing device to a computing device based on the user accessing the computing device.

Referring to FIG. 2, a flow chart illustrating an example method of identifying and transmitting actionable content identified from at least one computing device to at least one second computing device based on the user accessing the second computing device is provided. Other implementations may perform the steps in a different order, omit certain steps, and/or perform different and/or additional steps than those illustrated in FIG. 2. The steps of the method illustrated in FIG. 2 may be performed by one or more components illustrated in FIG. 1. The illustrated method identifies an association between at least one second computing device and a computing device and provides actionable content accessed on the computing device to the second computing device based on a confidence level associated with the actionable content.

At step 200, a computing device is identified. With reference to FIG. 1, the identified computing device may share one or more characteristics with the computing device 105 and/or the second computing device 130. In some implementations, step 200 may be performed by a component sharing one or more characteristics with communication server 125 and/or content submission engine 120. Identification of the computing device may be initiated by the computing device, by a communication server 125, and/or by another computing device that is accessed by the user.

For example, a user may utilize the second computing device 130 to contact a communication server 125 via a communication network 101. The user may additionally establish communication with the communication server 125 utilizing computing device 105. The communication server 125 may associate and/or identify an association between the second computing device 130 and the computing device 105 and transmit actionable content received by a content submission engine 120 to the second computing device 130. In some implementations, the communication server 125 may identify a computing device through user interactions with the computing device alone. For example, the user may access a browser 110 on computing device 105 and send a notification to the communication server 125 of a unique identifier of the second computing device 130 of the user, such as a phone number. The communication server 125 may establish contact with the second computing device 130 using the identifier, such as by sending a text message, an email, and/or a notification via BLUETOOTH and/or Wi-Fi. In some implementations, the communication server 125 may identify the second computing device 130 through a mapping between the user and the second computing device 130. For example, the user may utilize the same account, such as an email account, on the computing device 105 and the second computing device 130 so that the server may associate the user of the second computing device 130 as the same user of the computing device 105. Additional and/or alternative mappings between a user and one or more computers associated with the user may be utilized such as those discussed herein.

At step 205, content of one or more documents accessed by the user on another computing device is identified. For example, a user may access content of documents, such as PDFs, emails, and/or webpages on another computing device separate from the computing device identified in step 200. In some implementations, the documents may be user-edited documents. For example, a user may access one or more documents on computing device 105 and/or browser 110 and computing device 105 may optionally transmit information indicative of content of the documents to communication server 125, actionable content recognition engine 115, content submission engine 120, and/or second computing device 130. For example, computing device 105 may send the content itself. Also, for example, a document identifier of the document may be sent, such as a URL and/or a file location.

At step 210, the content identified at step 205 is analyzed to determine whether the content contains actionable content that may be of interest to the user on the computing device identified at step 200. In some implementations step 210 may be performed by actionable content recognition engine 115 as described herein. Actionable content may include, for example, names, email addresses, street addresses, phone numbers, and/or dates. Potential uses of the actionable content may optionally additionally be associated with the actionable content. Potential uses of the actionable content may be identified, for example, utilizing metadata, document location identifiers, an entity database, links to other webpages, the texts of links to other webpages, information regarding the historical usage of content by the current user, and/or historical usage of the content by one or more previous users. In some implementations, potential uses may be associated with actionable content using one or more considerations described herein.

At step 215, a use of the computing device identified at step 200 is identified. In some implementations, the nature of the use of the computing device may be provided to one or more components. For example, second computing device 130 may alert communication server 125 of activity the user is performing on the second computing device 130. The activity on second computing device 130 may include unlocking the second computing device 130 for use, one or more applications that are being accessed by the user on second computing device 130, and/or one or more inputs from the user, such as text input into a web browser, the start of a phone number typed into a phone dialing of the second computing device 130, and/or an email address typed into an email application. The second computing device 130 may alert communication server 125 of the application that is currently being accessed and/or may send a notification that the user is accessing second computing device 130 without further information about the application that the user is accessing.

At step 220, the actionable content identified in step 210 is associated with a confidence level based on the likelihood that the user has interest in accessing the actionable content on the computing device identified at step 200. Step 220 may be performed by actionable content recognition engine 115 and/or content submission engine 120 and the resulting confidence level may be transmitted to communication server 125 and/or directly to second computing device 130. A confidence level may be based on one or more considerations described herein. For example, the confidence level may be based on a determined importance of the actionable content in the accessed document, one or more properties of the computing device identified at step 200, one or more properties of the computing device identified at step 205, one or more properties of the accessed document, the time interval between accessing the actionable content on the computing device identified at step 205 and accessing the computing device identified at step 200, user actions in accessing the actionable content, and/or the potential uses of the actionable content.

At step 225, the actionable content is provided to the computing device identified at step 200 when the confidence level that the actionable content is of likely interest to the user satisfies a threshold. In some implementations, the content submission engine 120 may provide actionable content to the computing device as described herein. In some implementations, the threshold level utilized in step 225 may be based on one or more factors, such as user preferences, the potential uses of the actionable content, one or more properties of the computing device identified at step 200, one or more properties of the computing device identified at step 205, the application accessed by the user, predefined values, historical usage by other users, and/or historical usage by the current user. Actionable content may optionally be provided to the computing device through communication server 125. In some implementations, actionable content may be immediately provided to the computing device when the confidence level of interest in the actionable content exceeds the threshold. In some implementations, communication server 125 may send a notification to the computing device that actionable content is available and wait for a request from the computing device to provide the actionable content. In some implementations, the actionable content is provided to communication server 125 (optionally with a determined confidence level), and/or the computing device selectively retrieves actionable content as described herein, for example, in steps 305 and 310.

Figure 3:
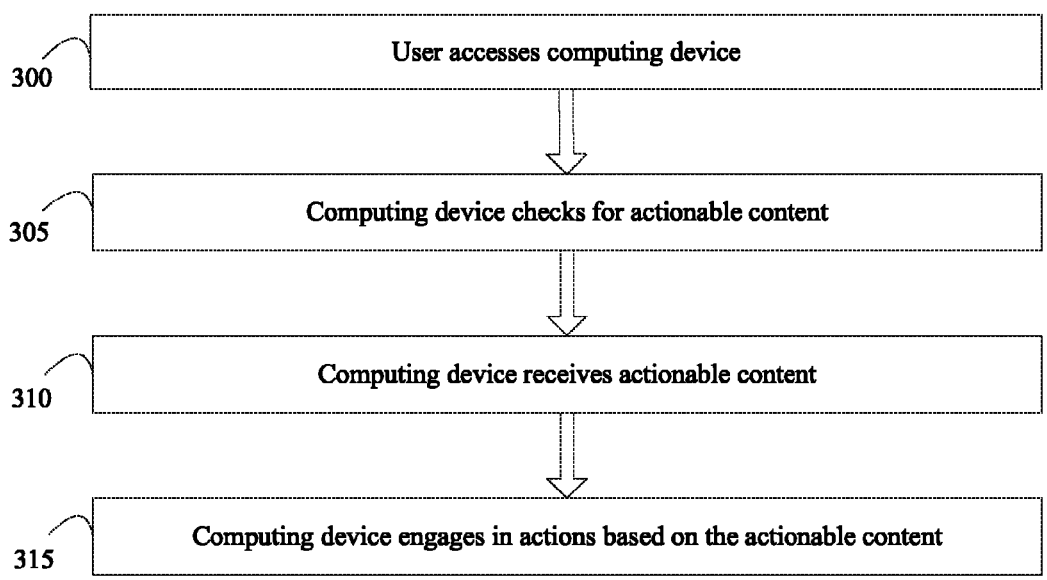
FIG. 3 is a flow chart illustrating an example method of retrieving content that has been identified as actionable content.

Referring to FIG. 3, a flow chart illustrating an example method of retrieving content that has been identified as actionable and of interest to a user on a computing device is provided. Other implementations may perform the steps in a different order, omit certain steps, and/or perform different and/or additional steps than those illustrated in FIG. 3. In some implementations, one or more steps of the illustrated method may be performed by a device that shares one or more characteristics with computing device 105 and/or second computing device 130.

At step 300, a user accesses a computing device. The computing device may recognize one or more interactions of the user with the computing device, such as the user initially accessing the computing device and/or an application on the second computing device. For example, the computing device may recognize a user unlocking the computing device as the initial accessing of the device. Also for example, the computing device may recognize a user accessing one or more applications on the computing device where actionable content may be utilized, including, for example, a mapping application, a dialing application, a calendar application, an email application, and/or an address book application via the computing device.

At step 305, the computing device checks for actionable content. In some implementations, the computing device may check for actionable content on a communication server that shares one or more characteristics with communication server 125. In some implementations, a communication server 125 and/or a content submission engine 120 may send a notification to the computing device that actionable content is available. In some implementations, the computing device may contact the communication server 125 and/or content submission engine 120 to determine whether actionable content is available. In some implementations, step 305 may not be performed, such as when the computing device is provided with actionable content automatically by communication server 125 and/or content submission engine 120 when determined to be of interest to the user.

At step 310, the computing device 130 receives actionable content from communication server 125 and/or content submission engine 120. In some implementations, the computing device may receive the actionable content automatically without providing further information to communication server 125. In some implementations, the computing device 130 may receive actionable content based on when and/or how the user accessed the computing device in step 300. For example, the computing device may recognize that the user accessed a mapping application. Also, for example, the computing device may receive actionable content based on the time interval between the user accessing the computing device and the actionable content becoming available. The computing device may check with communication server 125 for content that is usable with a particular accessed application and/or particularly with that computing device. In some implementations, the computing device may be provided with a notification from communication server 125 that actionable content is available without transmitting the actionable content. Content may be provided to the computing device via communication server 125 once the computing device identifies the type of actionable content that it would like to receive. In some implementations, a server may not send a notification to the computing device, but instead may make the actionable content available and the computing device may poll the communication server 125 when it is available to receive actionable content.

At step 315, the computing device utilizes the actionable content that it received at step 310. In some implementations, the computing device may determine how to utilize the actionable content based on the type of application that the user has accessed. For example, the computing device may receive a phone number as actionable content. The computing device may provide the phone number to a phone application if the user accesses the phone application. Additionally or alternatively, the computing device may provide the phone number to a contacts application if the user accesses a contacts application. In some implementations, the computing device may determine whether to utilize the actionable content based on the confidence level associated with the actionable content. In some implementations, a confidence level may be provided with actionable content at step 310. In some implementations, the computing device may determine a confidence level and/or modify a received confidence level.

Figure 4:
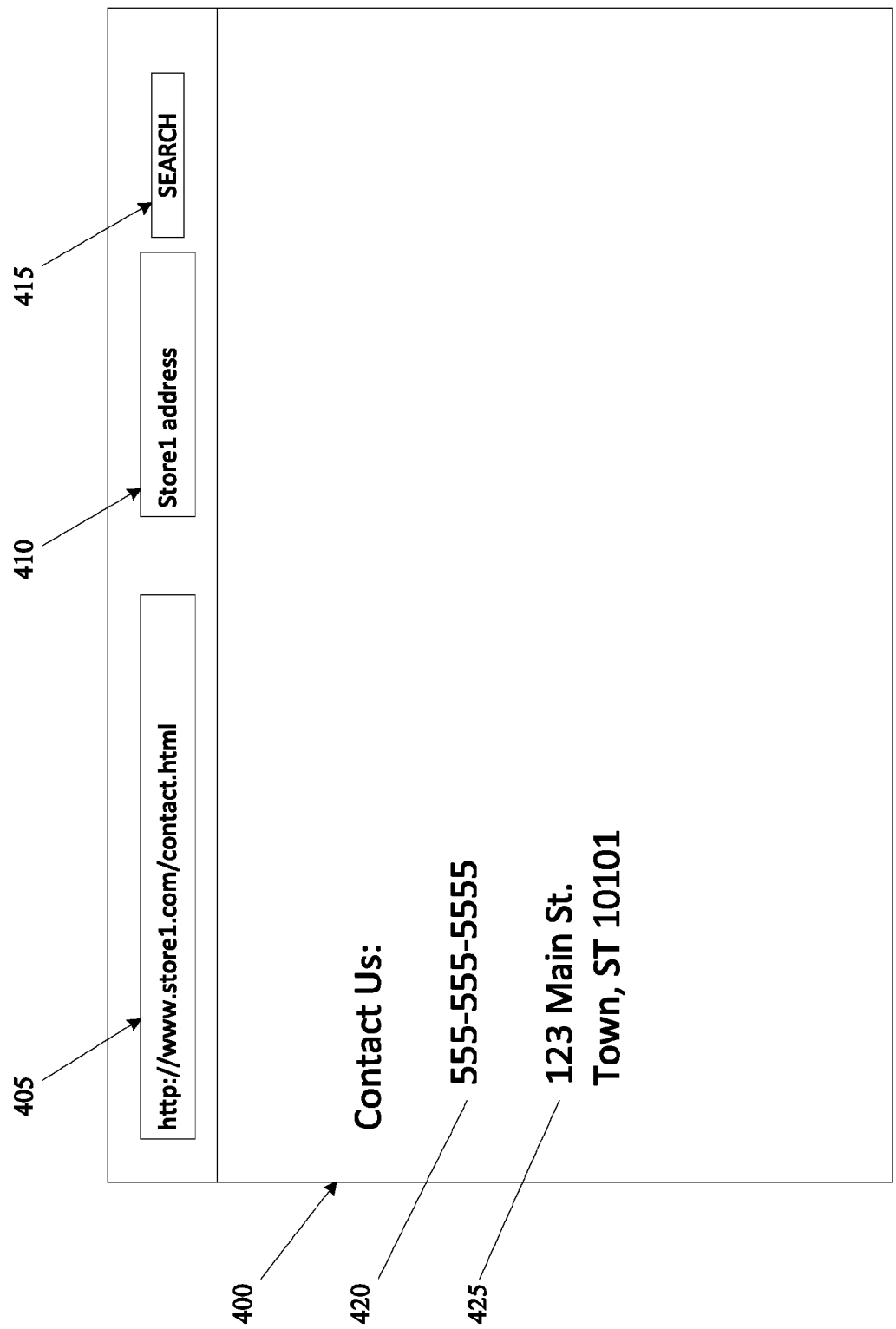
FIG. 4 illustrates an example graphical user interface for a computing device displaying actionable content on a webpage.

Referring to FIG. 4, an example graphical user interface displaying actionable content from a webpage is illustrated. The displayed graphical user interface is a webpage 400 that is accessed by the user on a browser which may share one or more characteristics with browser 110 as illustrated in FIG. 1. Webpage 400 includes an address bar 405 that displays the URL for the current webpage 400. Search box 410 may be utilized by the user to input search terms to submit to a search engine when search button 415 is selected or a search is otherwise initiated. Webpage 400 displays examples of actionable content that include a phone number 420 and an address 425. In some implementations, a browser that shares one or more characteristics with browser 110 of FIG. 1 may display webpage 400 to a user on computing device 105, and components that share one or more characteristics with content recognition engine 115 and content submission engine 120 may identify actionable content and selectively provide the actionable content to a second computing device as described herein.

Address bar 405 may be utilized by actionable content recognition engine 115 to determine that the webpage 400 may contain actionable content for one or more applications executing on second computing device 130. The URL illustrated in address bar 405 includes a store name (Store1) and the type of webpage associated with the URL (contact information). Actionable content recognition engine 115 may determine that webpage 400 likely contains actionable content and may subsequently search webpage 400 for content that matches common formats for actionable content and/or is otherwise identifiable as actionable content. In some implementations, content submission engine 120 may adjust the confidence level associated with located actionable content from webpage 400. For example, actionable content recognition engine 115 and/or content submission engine 120 may identify "Store1" as the source of the content of webpage 400 and adjust the confidence level to make it more likely that the confidence level satisfies the threshold based on the term "Store1" as the domain name of the URL in address bar 405. Actionable content recognition engine may identify "Store1" as an identifier and/or characteristic to associate with the actionable content on webpage 400, such as phone number 420 and/or address 425, and may provide content submission engine 120 with the associated identifier. Content submission engine 120 may provide the second computing device with the source "Store1" and/or adjust the confidence levels associated with phone number 420 and/or address 425 based on the identifier "Store1." In some implementations, the second computing device 130 and/or other computing device may be provided the identifier with the actionable content and utilize the identifier with the actionable content or as a substitute for displaying actionable content as illustrated in FIG. 5B and described herein. In some implementations, content submission engine 120 may adjust the confidence level associated with actionable content identified on webpage 400 based on the number of times the user has visited the page, historical evidence from other users who have utilized actionable content from the page, and/or other factors to determine that actionable content should be utilized by the second computing device 130 and/or other computing device based on the occurrence of "Contact Us" on webpage 400.

In some implementations, search terms entered into search box 410 may be utilized by actionable content recognition engine 115 to determine that webpage 400 may contain actionable content. For example, based on the entered search terms of search box 410, a user may be directed to search results that include webpage 400. Actionable content recognition engine 115 may determine that the resulting webpage 400 may contain actionable content that the user has interest in utilizing on a second computing device 130 and/or other computing device. Using one or more methods such as those described, actionable content recognition engine 115 may locate actionable content on webpage 400 and/or content submission engine 120 may assign the confidence level and/or potential uses for located actionable content based on terms entered in search box 410. For example, actionable content recognition engine 115 and/or content submission engine 120 may determine that the user is most likely to be interested in the address 425 on webpage 400 as opposed to the phone number 420 because the user entered the search term "address." Also, for example, actionable content recognition engine 115 may associate the term "Store1" with actionable content located on webpage 400 based on the search term "Store1."

Phone number 420 and address 425 may be recognized by actionable content recognition engine 115 as actionable content based on the format of the content. For example, actionable content recognition engine 115 may recognize that webpage 400 likely contains contact information based on previously described methods and then search webpage 400 for actionable content. Actionable content recognition engine 115 may recognize the alphanumeric string "555-555-5555" as a phone number and may provide content submission engine 120 with the string as potentially useful content. Also for example, actionable content recognition engine may recognize one or more terms of address 425 as a likely address and submit to content submission engine 120 the content as potentially actionable. Content submission engine 120 may assign potential uses and/or confidence levels to phone number 420 and/or address 425. The potential uses and/or confidence levels may optionally be utilized to determine whether the actionable content will be sent to the second computing device 130 and/or other computing device.

Referring to FIGS. 5A and 5B, example graphical user interfaces for a computing device displaying resulting actions from receiving actionable content are illustrated. FIG. 5A illustrates an example of a computing device executing a phone dialing application. FIG. 5B illustrates a user notification of options for using actionable content received by a computing device. Actionable content utilized by FIG. 5A and FIG. 5B may be identified on a webpage that shares one or more characteristics with webpage 400 and may be identified by modules that share one or more characteristics with actionable content recognition engine 115 and/or content submission engine 120. Actionable content may be transmitted to a computing device that shares one or more characteristics with computing device 105 and/or second computing device 130 and may be received via a server that shares one or more characteristics with communication engine 125.

FIG. 5A illustrates a phone dialing application 500A. In some implementations, phone dialing application 500A may be accessed by a user after unlocking a computing device. Additionally or alternatively, phone dialing application 500A may be activated on the computing device when actionable content is received by the computing device and the actionable content is determined to be of interest to the user. For example, the user may access webpage 400. Actionable content recognition engine 115 may recognize that phone number 420 is actionable content and may be used by the computing device. Content submission engine 120 may determine that the confidence level of user interest in the actionable satisfies a threshold and may provide phone number 422 to the computing device based on one or more methods described herein and phone number 420 may be transmitted to the computing device. In some implementations, the user may find that phone dialing application 500A is already displayed when the user accesses the computing device and phone number 420 is already entered in phone number box 505. The user may dial the phone number by pressing OK button 510 and/or may determine that the phone number is not of interest at that time and may cancel the phone dialing application 500A by pressing cancel button 515. In some implementations, phone dialing application 500A may be populated with phone number 420 and displayed on the next instance that the user accesses the phone dialing application on the second computing device 130.

FIG. 5B illustrates a notification screen 500B that contains a notification 520 informing the user of actionable content that is available and queries the user on which applications the user has interest in using the actionable content. In the illustrated notification 520, the user is queried on actionable content that is available from a webpage that shares one or more characteristics with webpage 400. In the illustrated example, the notification identifies that webpage 400 contains a phone number 420 and an address 425. Because the phone number and/or the address may be of interest to the user, a call button 525 and a locate button 530 are presented. Additionally, a cancel button 535 is offered for instances where the user is not interested in any provided content. A user may be directed to a screen similar to phone dialing application 500A when call button 525 is pressed, and may be directed to a mapping application when locate button 530 is pressed. In some implementations, a notification box 520 may display the actionable content. For example, the notification box 520 may query the user on whether to dial a particular phone number and/or may query the user on whether to map a particular address based on the actionable content received by the computing device. In some implementations, the notification box 520 may inquire whether the user would like to use actionable content with multiple applications. For example, a notification box may ask a user whether to utilize a phone number with a phone dialing application, a contact directory application, and/or not to utilize the content at all. In the illustrated implementation, the notification box 520 also displays an identifier of the phone number and/or address that has been determined to be actionable content (Store1). Actionable content may be associated with an identifier by actionable content recognition engine 115 based on one or more methods as described herein.

FIG. 6 is a block diagram of an example computer system 610. Computer system 610 typically includes at least one processor 614 which communicates with a number of peripheral devices via bus subsystem 612. These peripheral devices may include a storage subsystem 624, including, for example, a memory subsystem 626 and a file storage subsystem 628, user interface input devices 622, user interface output devices 620, and a network interface subsystem 616. The input and output devices allow user interaction with computer system 610. Network interface subsystem 616 provides an interface to outside networks and is coupled to corresponding interface devices in other computer systems.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 610 to the user or to another machine or computer system.

Storage subsystem 624 stores programming and data constructs that provide the functionality of some or all of the modules described herein. For example, the storage subsystem 624 may include the logic to identify and/or transmit actionable content from a computing device to one or more other computing devices based on the likelihood of a user having interest in accessing the actionable content from the other computing devices.

These software modules are generally executed by processor 614 alone or in combination with other processors. Memory 626 used in the storage subsystem can include a number of memories including a main random access memory (RAM) 630 for storage of instructions and data during program execution and a read only memory (ROM) 632 in which fixed instructions are stored. A file storage subsystem 628 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 628 in the storage subsystem 624, or in other machines accessible by the processor(s) 614.

Bus subsystem 612 provides a mechanism for letting the various components and subsystems of computer system 610 communicate with each other as intended. Although bus subsystem 612 is shown schematically as a single bus, alternative implementations of the bus subsystem may use multiple busses.

Computer system 610 can be of varying types including a workstation, server, computing cluster, blade server, server farm, or any other data processing system or computing device. Due to the ever-changing nature of computing devices and networks, the description of computer system 610 depicted in FIG. 6 is intended only as a specific example for purposes of illustrating some implementations. Many other configurations of computer system 610 are possible having more or fewer components than the computer system depicted in FIG. 6.

While several inventive implementations have been described and illustrated herein, a variety of other means and/or structures for performing the function and/or obtaining the results and/or one or more of the advantages described herein may be utilized, and each of such variations and/or modifications is deemed to be within the scope of the inventive implementations described herein. More generally, all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive implementations described herein. It is, therefore, to be understood that the foregoing implementations are presented by way of example only and that, within the scope of the appended claims and equivalents thereto, inventive implementations may be practiced otherwise than as specifically described and claimed. Inventive implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over vocabulary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one implementation, to A only (optionally including elements other than B); in another implementation, to B only (optionally including elements other than A); in yet another implementation, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one implementation, to at least one, optionally including more than one, A, with no B present (and optionally including elements other than B); in another implementation, to at least one, optionally including more than one, B, with no A present (and optionally including elements other than A); in yet another implementation, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A computer implemented method, comprising:
   identifying a computing device of a user, the computing device configured to execute one or more applications;
   identifying content accessed on at least one other computing device by the user, the other computing device being separate from the computing device;
   determining actionable content based on the content accessed on the other computing device by the user, wherein the actionable content is useable by one or more applications on the computing device;
   identifying a use of the computing device by the user;
   determining a confidence level of interest in the actionable content, the confidence level based on an indication of time passage between the user accessing the content on the other computing device and the identified use of the computing device by the user; and
   providing the actionable content to the computing device if the confidence level of interest in the actionable content satisfies a threshold.

2. The method of claim 1, wherein the identified use is indicative of executing a given application of the one or more applications.

3. The method of claim 2, further comprising determining at least one potential use for the actionable content.

4. The method of claim 3, further comprising comparing the identified use and the potential use, wherein the confidence level is based on the comparison.

5. The method of claim 4, wherein the actionable content is provided to the user only when the at least one potential use includes the identified use.

6. The method of claim 1, further comprising:
   identifying at least one potential use for the actionable content;
   identifying a likely type of use of the computing device; and
   comparing the likely type of use to the potential use;
      wherein the confidence level is based on the comparison.

7. The method of claim 1, further comprising determining whether the actionable content is actively displayed on the other computing device, wherein the confidence level is based on whether the actionable content is actively displayed on the computing device.

8. The method of claim 7, wherein the confidence level satisfies the threshold when the actionable content is actively displayed on the computing device.

9. The method of claim 1, further comprising determining at least one potential use for the actionable content based on one or more actions taken by the user to arrive at the identified content.

10. The method of claim 9, wherein the one or more actions include utilizing a given search term in accessing the identified content.

11. The method of claim 9, wherein the one or more actions include utilizing a given navigation link in accessing the identified content.

12. The method of claim 1, further comprising determining the confidence level based on one or more actions taken by the user to arrive at the identified content.

13. The method of claim 12, wherein the one or more actions include utilizing a given search term in accessing the identified content.

14. The method of claim 12, wherein the one or more actions include utilizing a given navigation link in accessing the identified content.

15. The method of claim 1, further comprising identifying a likely use type of the computing device and comparing the likely use type to the actionable content, wherein the confidence level is based on the comparison.

16. The method of claim 1, further comprising identifying a likelihood of utilizing the actionable content on the other computing device, wherein the confidence level is based on the likelihood of utilizing the actionable content on the other computing device.

17. A system including memory and one or more processors operable to execute instructions, stored in the memory, including instructions to perform the operations of:
   identifying a computing device of a user, the computing device configured to execute one or more applications;
   identifying content accessed on at least one other computing device by the user, the other computing device being separate from the computing device;
   determining actionable content based on the content accessed on the other computing device by the user, wherein the actionable content is useable by one or more applications on the computing device;
   identifying a use of the computing device by the user;
   determining a confidence level of interest in the actionable content, the confidence level based on an indication of time passage between the user accessing the content on the other computing device and the identified use of the computing device by the user; and
   providing the actionable content to the computing device if the confidence level of interest in the actionable content satisfies a threshold.

18. The system of claim 17, wherein the identified use is indicative of executing a given application of the one or more applications.

19. The system of claim 18, wherein the instructions further include instructions to perform the operation of determining at least one potential use for the actionable content.

20. The system of claim 19, wherein the instructions further include instructions to perform the operation comparing the identified use and the potential use, wherein the confidence level is based on the comparison.

21. The system of claim 20, wherein the actionable content is provided to the user only when the at least one potential use includes the identified use.

22. The system of claim 20, wherein the instructions further include instructions to perform the operations of:
   identifying at least one potential use for the actionable content;
   identifying a likely type of use of the computing device; and
   comparing the likely type of use to the potential use;
      wherein the confidence level is based on the comparison.

23. The system of claim 17, wherein the instructions further include instructions to perform the operation of determining whether the actionable content is actively displayed on the other computing device, wherein the confidence level is based on whether the actionable content is actively displayed on the computing device.

24. The system of claim 17, wherein the instructions further include instructions to perform the operation of determining at least one potential use for the actionable content based on one or more actions taken by the user to arrive at the identified content.

25. The system of claim 17, wherein the instructions further include instructions to perform the operation of determining the confidence level based on one or more actions taken by the user to arrive at the identified content.

26. The system of claim 17, wherein the instructions further include instructions to perform the operations of identifying a likely use type of the computing device and comparing the likely use type to the actionable content, wherein the confidence level is based on the comparison.

27. The system of claim 17, wherein the instructions further include instructions to perform the operation of identifying a likelihood of utilizing the actionable content on the other computing device, wherein the confidence level is based on the likelihood of utilizing the actionable content on the other computing device.

28. A non-transitory computer readable storage medium storing computing device instructions executable by a processor to perform a method comprising:
  identifying a computing device of a user, the computing device configured to execute one or more applications;
  identifying content accessed on at least one other computing device by the user, the other computing device being separate from the computing device;
  determining actionable content based on the content accessed on the other computing device by the user, wherein the actionable content is useable by one or more applications on the computing device;
  identifying a use of the computing device by the user;
  determining a confidence level of interest in the actionable content, the confidence level based on an indication of time passage between the user accessing the content on the other computing device and the identified use of the computing device by the user; and
  providing the actionable content to the computing device if the confidence level of interest in the actionable content satisfies a threshold.

* * * * *